United States Patent
Chamness

(10) Patent No.: US 9,558,200 B2
(45) Date of Patent: Jan. 31, 2017

(54) CAPACITY FORECASTING FOR A DEDUPLICATING STORAGE SYSTEM

(71) Applicant: EMC Corporation, Hopkinton, MA (US)

(72) Inventor: Mark Chamness, Menlo Park, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/267,675

(22) Filed: May 1, 2014

(65) Prior Publication Data

US 2014/0330793 A1 Nov. 6, 2014

Related U.S. Application Data

(63) Continuation of application No. 13/174,504, filed on Jun. 30, 2011, now Pat. No. 8,751,463.

(51) Int. Cl.
| | |
|---|---|
| *G06F 17/30* | (2006.01) |
| *G06F 3/06* | (2006.01) |
| *G06F 11/30* | (2006.01) |
| *G06F 11/34* | (2006.01) |

(52) U.S. Cl.
CPC ......... *G06F 17/30156* (2013.01); *G06F 3/067* (2013.01); *G06F 3/0608* (2013.01); *G06F 3/0614* (2013.01); *G06F 3/0641* (2013.01); *G06F 3/0653* (2013.01); *G06F 11/3034* (2013.01); *G06F 11/3442* (2013.01); *G06F 11/3452* (2013.01); *G06F 17/30153* (2013.01); *Y02B 60/165* (2013.01)

(58) Field of Classification Search
CPC ............ G06F 17/3015; G06F 17/30153; G06F 17/30156
USPC ......... 707/692, 693; 711/161, 162, 170, 171
See application file for complete search history.

(56) References Cited

U.S. PATENT DOCUMENTS

| | | | |
|---|---|---|---|
| 6,317,808 B1 * | 11/2001 | Berenshteyn | 711/112 |
| 7,783,510 B1 * | 8/2010 | Gilgur et al. | 705/7.25 |
| 8,219,368 B1 * | 7/2012 | Akella | G06Q 10/04 703/6 |
| 2003/0220899 A1 * | 11/2003 | Numanoi et al. | 707/1 |
| 2004/0153471 A1 * | 8/2004 | Saika et al. | 707/104.1 |
| 2007/0101074 A1 | 5/2007 | Patterson | |
| 2007/0294206 A1 * | 12/2007 | Korman | G06F 3/0617 |
| 2008/0281564 A1 * | 11/2008 | Suzuki et al. | 703/2 |
| 2008/0320218 A1 * | 12/2008 | Nagata | 711/114 |
| 2009/0013129 A1 | 1/2009 | Bondurant | |
| 2009/0144518 A1 | 6/2009 | Lewis et al. | |
| 2010/0082287 A1 * | 4/2010 | Bonino et al. | 702/150 |
| 2010/0250748 A1 * | 9/2010 | Sivasubramanian et al. | 709/226 |
| 2011/0289290 A1 * | 11/2011 | Akirav et al. | 711/162 |
| 2012/0023233 A1 * | 1/2012 | Okamoto | G06F 9/4856 709/226 |

* cited by examiner

*Primary Examiner* — Hares Jami
(74) *Attorney, Agent, or Firm* — Blakely, Sokoloff, Taylor & Zafman LLP

(57) ABSTRACT

A system for managing a storage system comprises a processor and a memory. The processor is configured to receive storage system information from a deduplicating storage system. The processor is further configured to determine a capacity forecast based at least in part on the storage system information. The processor is further configured to provide a compression forecast. The memory is coupled to the processor and configured to provide the processor with instructions.

27 Claims, 14 Drawing Sheets

CAPACITY FORECASTING FOR A DEDUPLICATING STORAGE SYSTEM

CROSS REFERENCE TO OTHER APPLICATIONS

This application is a continuation of co-pending U.S. patent application Ser. No. 13/174,504 entitled CAPACITY FORECASTING FOR A DEDUPLICATING STORAGE SYSTEM filed Jun. 30, 2011 which is incorporated herein by reference for all purposes.

BACKGROUND OF THE INVENTION

Organizations are generating and accumulating increasingly large amounts of electronic data that needs to be properly retained and promptly accessible when needed. Given the large volume of data involved and the extended retention period for much of this data, it is critical that a storage system have adequate storage capacity. One way of having adequate storage capacity is to use an efficient storage system such as a deduplicating storage system. However, even with a deduplicating system, it is possible to run out of storage space. If storage space is filled up in an unplanned manner, users are not able to store any new data and the system will not be able to fulfill the user's needs.

BRIEF DESCRIPTION OF THE DRAWINGS

Various embodiments of the invention are disclosed in the following detailed description and the accompanying drawings.

DETAILED DESCRIPTION

Figure 1:
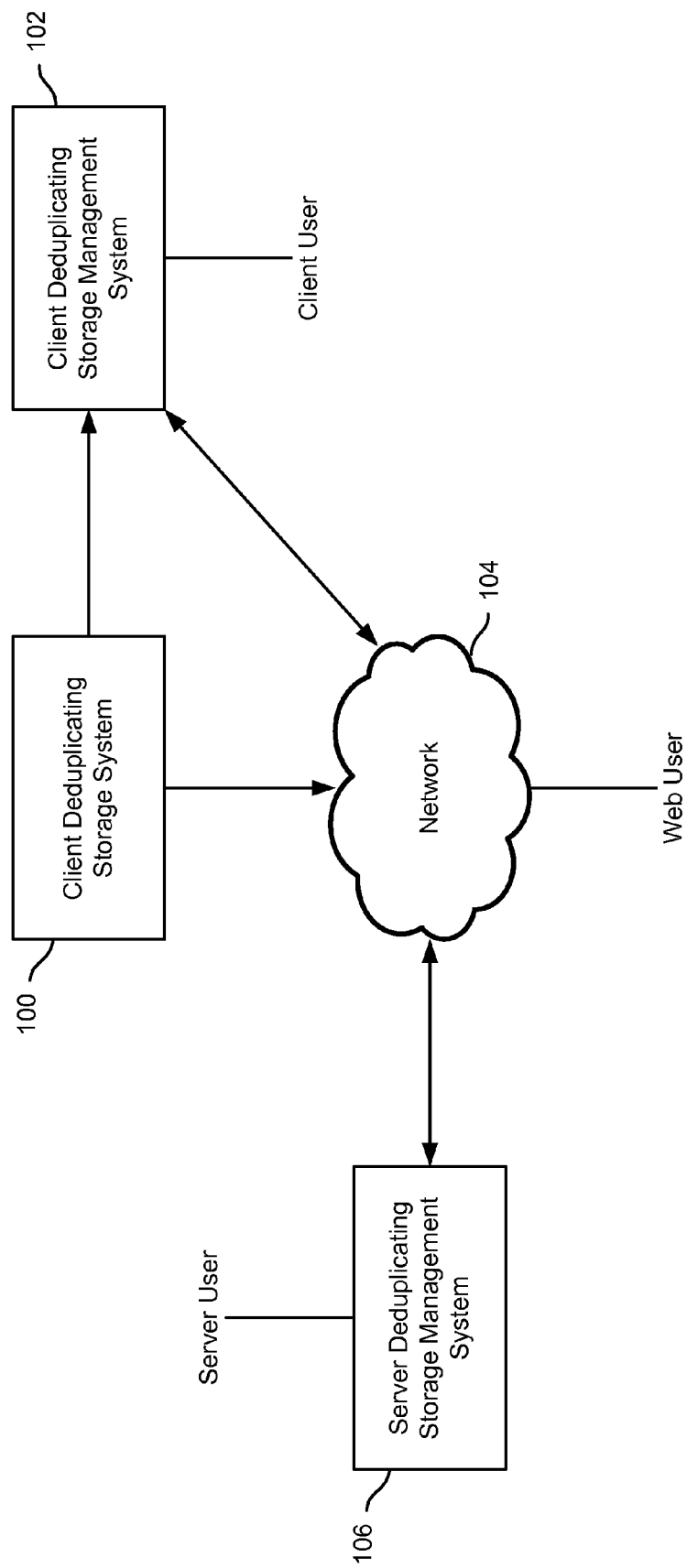
FIG. 1 is a block diagram illustrating an embodiment of a system for capacity forecasting for a deduplicating storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Capacity forecasting for a deduplicating storage system is disclosed. A system for managing a storage system comprises a processor and a memory. The processor is configured to receive storage system information of a deduplicating storage system, to determine a capacity forecast based at least in part on the storage system information, and to provide a capacity forecast. In various embodiments, the storage information comprises one or more of the following: total capacity, amount of capacity used, date information, and any other appropriate storage information or performance parameter. The memory is coupled to the processor and configured to provide the processor with instructions.

In some embodiments, a management tool is able to determine likely failure points of the system by predicting capacity or compression factors. This prediction can be used to make sure that the system will not fail because action can be taken before failure to prevent the failure. For example, more storage units can be added to the system or the existing storage units of the system can be purged of older or less desired files or files can be migrated to other tiers of a storage hierarchy (e.g., tape, off-site storage, off-line storage, etc.).

In some embodiments, a storage system is able to be cost-effectively and energy efficiently used to store files. To efficiently store the files, the file (or any input data stream) is broken into segments. For example, a hash function is used to determine a segment boundary by evaluating that hash function over a window of data in the file and looking for a location associated with a minimum or maximum value that will make a segment with a length longer than a minimum length but shorter than a maximum length. Or for another example, a fixed length is used to break up the file into segments. The files are stored as one or more segments, where the segments are deduplicated (e.g., the system targets having only one copy stored and this one copy is/can be used to reconstruct more than one file that each have the segment as part of their original content) in the storage system (e.g., deduplicated across one storage unit of the system).

In some embodiments, segments are stored in a main storage unit and periodically (e.g., every week) are transferred to a second storage unit. The transfer is based on a transfer protocol (e.g., storage unit is above a capacity limit, a number of segments every hour, when inactive, etc.), on when the storage unit is full, or on when the system meets one or more conditions (e.g., is 80% full, is less than 20% active, has had no accesses in last hour, etc.). In some embodiments, the transfer comprises copying and storing segments belonging to files identified based on a migration policy (e.g., files of a certain file type that have not been modified or accessed for a predetermined period of time are to be migrated, etc.) on a second storage unit from a primary system. As the second storage unit is filled (e.g., the segments are transferred over), metadata is transferred to the second storage unit so that the second storage unit has all the necessary information to access files based solely on information stored in the second storage unit. The metadata enables the system to reconstruct files that are stored in the system (e.g., in the whole system, in a storage unit, etc.) and/or associated files that are stored in the system with their file names. This also allows the system to power down a storage unit for energy conservation or to take a storage unit off-line to upgrade a storage unit or to enable the system to be fault tolerant in that the system can operate if any given storage unit fails. When a storage unit fills, the system transfers segments from the main storage unit to another storage unit.

In some embodiments, the system can be expanded by adding storage units incrementally. Files are accessed using the single name space providing an easy to use interface. Hardware is efficiently used as only one deduplicating engine is used for multiple storage units.

In some embodiments, the system does not have a main storage unit and stores segments in a first storage unit and then when the first storage unit is full, the system stores segments in a second storage unit.

In some embodiments, a file is identified by a name that is independent of the storage unit the file is stored in. When a file is received to be stored, a name is also received to be associated with the file. When a request to read a file is received, a name is also received. The system looks up the metadata associated with the files in the system to identify the file associated with the received name. It then looks up the metadata associated with the identified file to determine the storage unit the identified file is stored in. In various embodiments, the metadata associated with the files in the system is maintained in a main storage unit, is maintained in each storage unit where the files associated with the metadata are stored, is maintained in a distributed and/or redundant manner across many storage units (e.g., for fault tolerance), is maintained in a separated storage unit or storage unit, or any other appropriate storage location.

In some embodiments, when a next available storage unit is identified (e.g., selected) as the active storage unit, the metadata associated with the files in the system is copied to the active storage unit. This allows the metadata associated with the files in the system to be available when only the storage unit is powered up. In some embodiments, subsequent updates to the metadata associated with the files are made only to the copy of the metadata stored in the active storage unit.

In some embodiments, if the active storage unit is full, all metadata updates are flushed to the active storage unit so that each storage unit contains at least enough metadata to provide access to the files it contains. When the active storage unit fails, the system uses the metadata contained in other attached storage units (e.g., a previously active storage unit) to provide access to the files still in the system. In some embodiments, when a storage unit is unavailable (e.g. the storage unit has failed, is being upgraded, etc.), the system remains up to provide access to any file not stored in the failed storage unit.

In some embodiments, the system includes a power management unit. In the event that a storage unit is predicted to be idle for some time, the system powers down the storage unit. The system is still able to access files on any other storage unit that is not powered down. Subsequently, when the system receives a request directed at the storage unit, the system powers up the storage unit. Powering down a storage unit may include powering off some of the electronics in the disks in the storage unit, spinning down the disks, powering down the disks and/or powering down the electronics in the storage unit, or any other appropriate power saving step. The power down action may depend on how long the storage unit is predicted to be idle. In some embodiments, the length of time a storage unit is predicted to be idle is based on how long the storage unit has been idle. For example, if a storage unit has not received any request for a predetermined period of time, the disks in the storage unit are spun down. In the event that the storage unit has not received any request for a further predetermined period of time, the disks in the storage unit are powered off. In some embodiments, the system tracks the number of times a disk has been power cycled and uses the power cycling information to determine the appropriate power down action. For example, when the number of power cycles exceeds a predetermined threshold, the system may decide not to power down the disk any more.

In some embodiments, in the event that a file is deleted, the metadata associated with the files in the system is updated to reflect that the file is deleted. Subsequently, a space reclamation process is performed to compact the remaining files to fill up entire storage units by transferring files that have not been deleted from a storage unit (e.g., a container, drive, array of drives, etc.) to a new storage unit and deduplicating segments stored in the new storage unit. Once files have been transferred from the old storage unit, the storage unit can be made available to store new files.

In some embodiments, the system comprises a backup storage system. In some embodiments, the system is a deduplicating storage system (e.g., a storage system such as the Data Domain product of EMC Corporation, of Hopkinton, Mass.). Each storage unit is a deduplication domain, meaning that duplicate chunks of data (e.g., segments) are identified only within each storage unit and not across different storage units. Each storage unit contains a segment index that can be used to determine whether a segment already exists in the storage unit. In some embodiments, the segment index uses fingerprints to index segments.

In some embodiments, the system described is used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers comprise different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In some embodiments, the storage system follows a retention policy where files of different ages are retained or not retained (e.g., files older than 7 years are removed). In some embodiments, the retention policy is dependent on type of file (e.g., financial information is retained indefinitely, email is retained for 1 year, tax information is retained 7 years, etc.).

FIG. 1 is a block diagram illustrating an embodiment of a system for capacity forecasting for a deduplicating storage system. In the example shown, client deduplicating storage system 100 is managed by client deduplicating storage management system 102. For example, client deduplicating storage management system 102 provides a manager tools to monitor a storage system (e.g., performance metrics), to control the storage system (e.g., to adjust garbage collection frequency when no longer used segments are deleted), to adjust parameters for the storage system, to analyze the storage system (e.g., determine statistics based on metrics, model performance, performance), to provide notifications or reports about the storage system, etc. Client deduplicating storage system 100 is further managed by server deduplicating storage management system 106 via network 104. In various embodiments, network 104 comprises one or more of a wired network, a wireless network, a local area network, a wide area network, the Internet, or any other appropriate network. In some embodiments, a client user manages a plurality of deduplicating storage management systems associated with the client user using client deduplicating storage management system 102. In some embodiments, a server user manages a plurality of deduplicating storage management systems associated with a plurality of client users using server deduplicating storage management system 106. In some embodiments, a user comprises a sales representative, a technical consultant, or any other appropriate user.

Figure 2A:
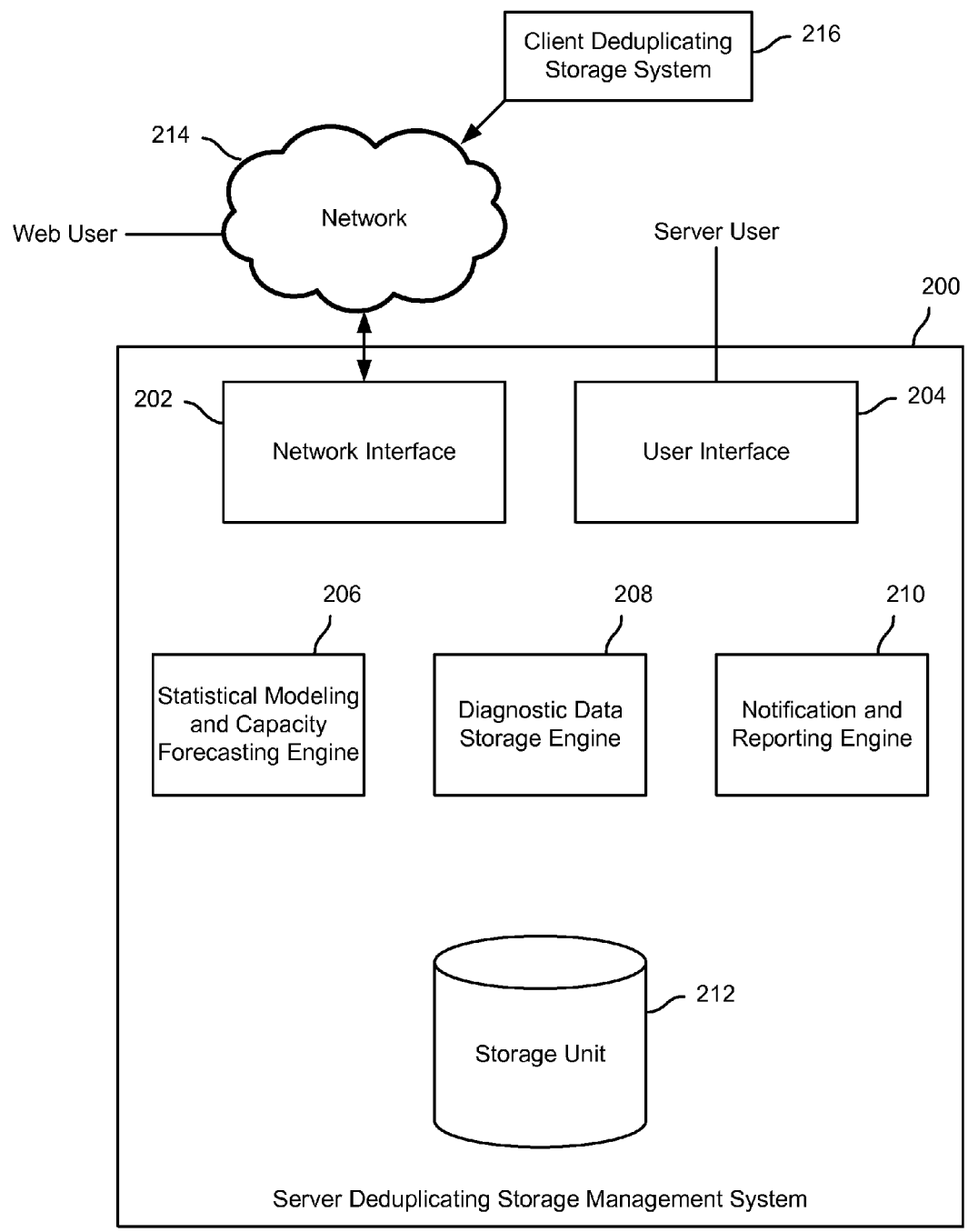
FIG. 2A is a block diagram illustrating an embodiment of a server deduplicating storage management system.

FIG. 2A is a block diagram illustrating an embodiment of a server deduplicating storage management system. In some embodiments, the system of FIG. 2A is used to implement server deduplicating storage management system 106 of FIG. 1. In the example shown, server deduplicating storage management system 200 comprises network interface 202, user interface 204, statistical modeling and capacity forecasting engine 206, diagnostic data storage engine 208, notification and reporting engine 210, and storage unit 212. In some embodiments, network interface 202 communicates with network 214. In some embodiments, user interface 204 communicates with a server user. In some embodiments, statistical modeling and capacity forecasting engine 206 determines statistical modeling and capacity forecasting associated with a deduplicating storage system. In some embodiments, diagnostic data storage engine 208 stores diagnostic data associated with a deduplicating storage system to storage unit 212. In some embodiments, notification and reporting engine 210 provides notification and reporting to a server user and/or a web user. In some embodiments, server deduplicating storage management system 106 receives storage information associated with a number of different client systems and is able to provide aggregated statistics or predictions based on data across clients and individual storage system installations as well as just a single installation or a single system. In some embodiments, reports or prediction results or notifications are sent to client interface representatives to provide service/sales support for systems with an existing or predicted failure to address the existing or predicted failure(s).

Figure 2B:
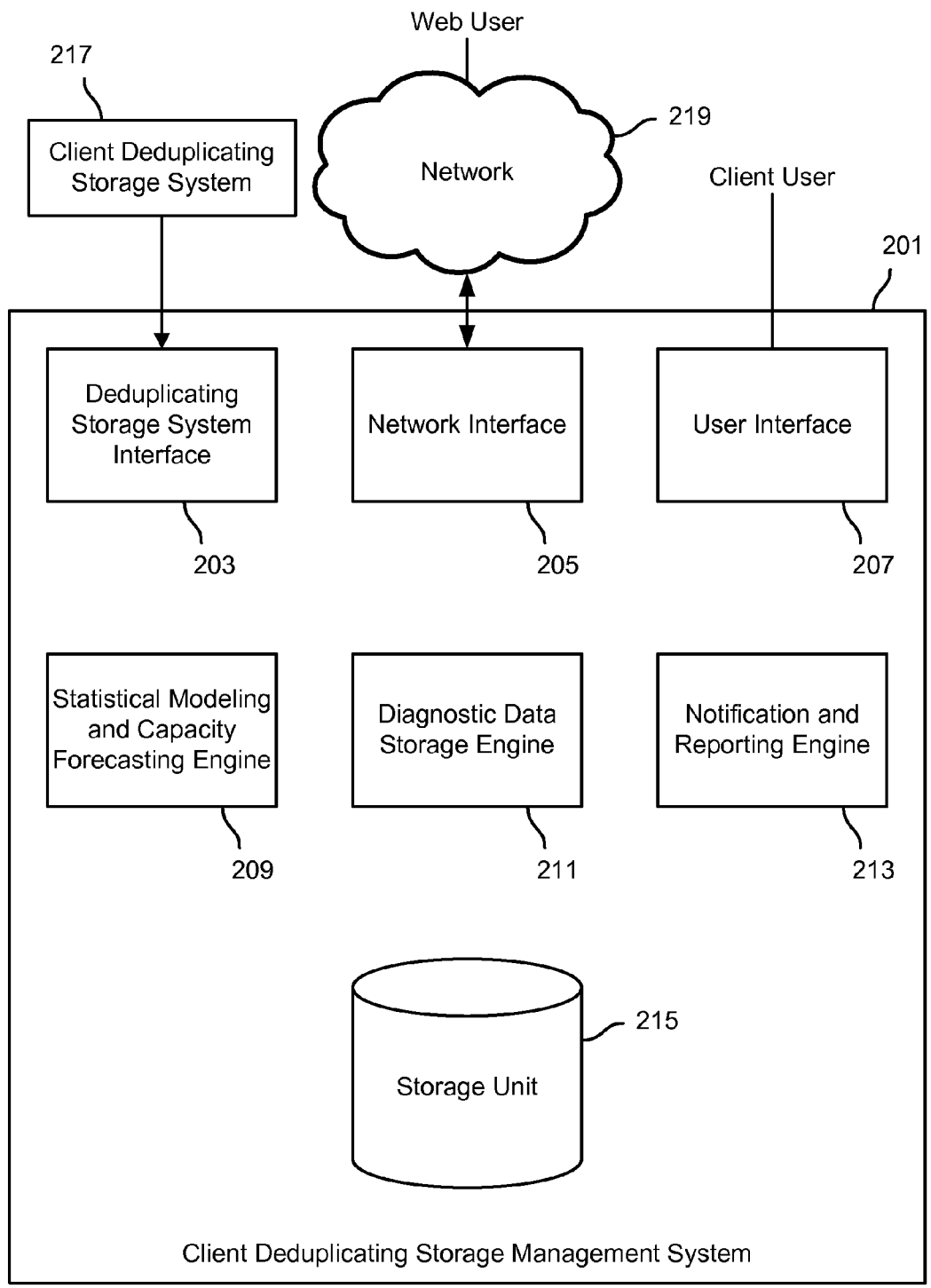
FIG. 2B is a block diagram illustrating an embodiment of a client deduplicating storage management system.

FIG. 2B is a block diagram illustrating an embodiment of a client deduplicating storage management system. In some embodiments, the system of FIG. 2B is used to implement client deduplicating storage management system 102 of FIG. 1. In the example shown, client deduplicating storage management system 201 comprises deduplicating storage system interface 203, network interface 205, user interface 207, statistical modeling and capacity forecasting engine 209, diagnositic data storage engine 211, notification and reporting engine 213, and storage unit 215. In some embodiments, deduplicating storage system interface 203 communicates with a deduplicating storage system. In some embodiments, network interface 205 communicates with network 219. In some embodiments, user interface 207 communicates with a client user. In various embodiments, statistical modeling and capacity forecasting engine 209 determines statistical modeling and capacity forecasting associated with a deduplicating storage system. In some embodiments, diagnostic data storage engine 211 stores diagnostic data associated with a deduplicating storage system to storage unit 215. In various embodiments, notification and reporting engine 213 provides notification and reporting to a client user, a web user, or any other appropriate user.

In some embodiments, diagnostic data comprises total storage capacity, total storage capacity used, precompression size, cumulative compressed size, metadata size, index size, associated date and/or time-stamp of the diagnostic data, or any other appropriate diagnostic data. In some embodiments, precompression size comprises a size of storage capacity of a deduplicating storage system prior to compression performed by the deduplicating storage system. In some embodiments, cumulative compressed size comprises physical used space of a deduplicating storage system. In some embodiments, metadata size comprises total size of metadata stored in a deduplicating storage system. In some embodiments, index size comprises total size of indices stored in a deduplicating storage system. In various embodiments, total storage capacity, total storage capacity used, precompression size, cumulative compressed size, metadata size, and/or index size are measured in gigabytes or any other appropriate unit.

In some embodiments, a storage unit stores performance data associated with a deduplicating storage system. In various embodiments, performance data comprises diagnostic data associated with a deduplicating storage system, statistical measures, capacity forecasting data, or any other appropriate performance data. In various embodiments, performance data comprises a capacity threshold date, total storage capacity, total storage capacity used, percentage of total storage capacity used, space usage rate per day, a date a most recent diagnostic data summary was received, a date a most recent Autosupport was received, a hostname associated with a deduplicating storage system, compression factor, a version of operating system software operating on a deduplicating storage system, or any other appropriate performance data. In some embodiments, an Autosupport comprises a summary of diagnostic data associated with a deduplicating storage system. In various embodiments, a summary of diagnostic data associated with a deduplicating storage system is received by a local client deduplicating storage management system, remote server deduplicating storage management system, or any appropriate deduplicating storage management system. In various embodiments, a storage unit comprises a storage device, multiple storage devices, a portion of a storage device, a hard drive, an array of drives, a semiconductor memory, or any other appropriate storage unit.

Figure 3:
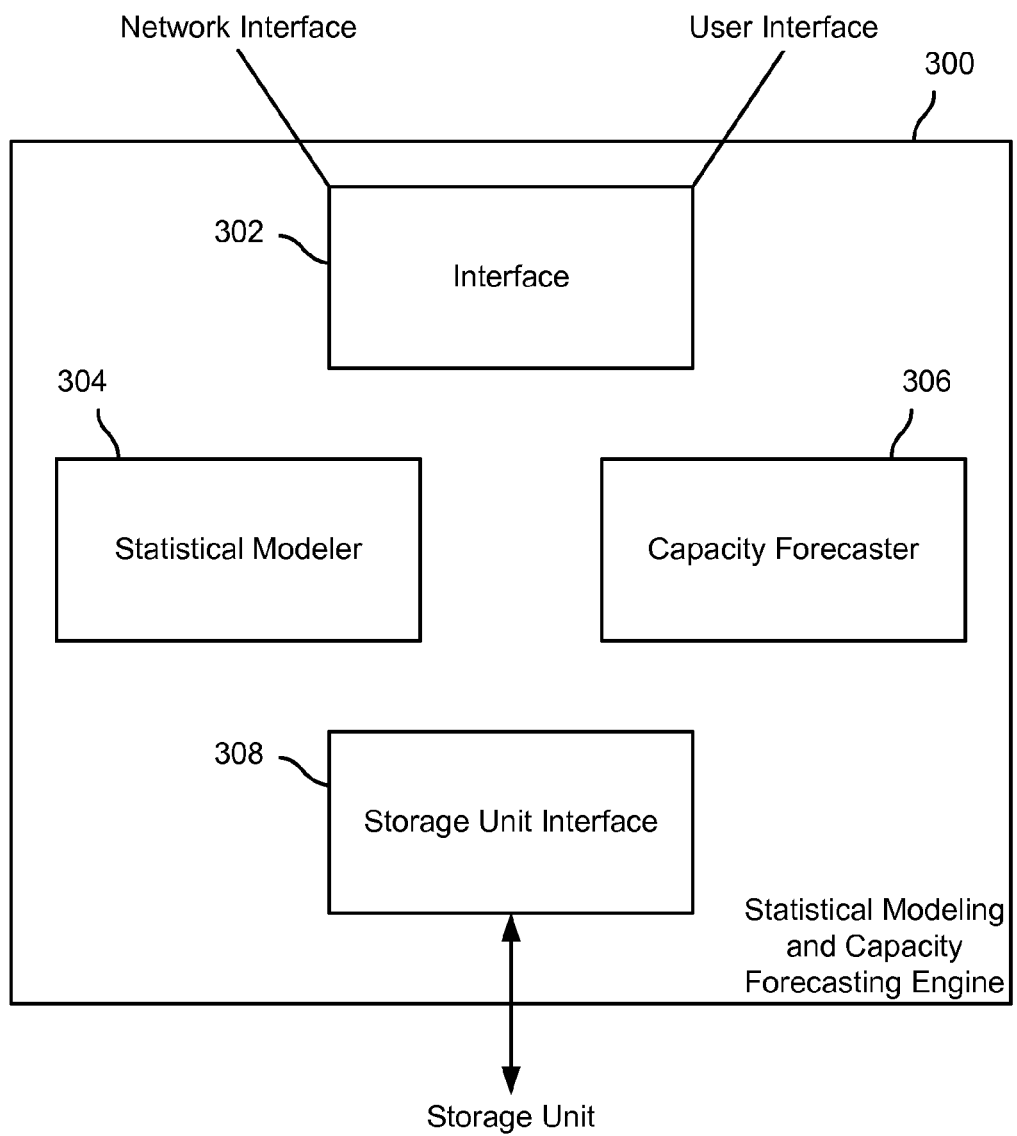
FIG. 3 is a block diagram illustrating an embodiment of a statistical modeling and capacity forecasting engine.

FIG. 3 is a block diagram illustrating an embodiment of a statistical modeling and capacity forecasting engine. In some embodiments, the system of FIG. 3 is used to implement statistical modeling and capacity forecasting engine 206 of FIG. 2A and/or statistical modeling and capacity forecasting engine 209 of FIG. 2B. In the example shown, statistical modeling and capacity forecasting engine 300 of FIG. 3 comprises interface 302, statistical modeler 304, capacity forecaster 306, and storage unit interface 308. In various embodiments, interface 302 communicates with a network interface and/or a user interface. In various embodiments, data determined by statistical modeler 304 and/or capacity forecaster 306 are/is stored to a storage unit using storage unit interface 308.

In some embodiments, a statistical modeler determines statistical modeling. In some embodiments, statistical modeling comprises determining statistical measures of a set of data associated with a deduplicating storage system. In some embodiments, a set of data associated with a deduplicating storage system is received from a storage unit. In some embodiments, the set of data is historical data associated with the deduplicating storage system. In some embodiments, the set of data is observed data associated with the deduplicating storage system. In various embodiments, statistical measures comprise a standard deviation, an average, or any other appropriate statistical measures. For example, determining a 14 day average of total storage capacity used comprises selecting a set of 14 dates. 14 total storage capacity used data points are selected from a storage unit, where each of the total storage capacity used data points corresponds to the total storage capacity used on one of the selected 14 dates. The 14 data points are averaged to determine a 14 day average of total storage capacity used. In some embodiments, determined statistical measures are stored to a storage unit. For example, the standard deviation of a total storage capacity used data point with respect to a determined mean and/or estimate of total storage capacity used is stored to a storage unit. In another example, the number of standard deviations an n-day average of total storage capacity used is away from a m-day average of total storage capacity used, where n and m are different numbers, is determined. The number of standard deviations indicates a divergence of recent behavior from historical behavior.

In some embodiments, a capacity forecaster determines capacity forecasting. In some embodiments, capacity forecasting comprises predicting total storage capacity used by a deduplicating storage system at a specified date and/or time. In some embodiments, capacity forecasting comprises determining a forecasted capacity threshold date. For example, a forecasted capacity threshold date (or some other appropriate criteria) comprises a forecasted date on which a threshold amount of total storage capacity of a deduplicating storage system will be used. In some embodiments, a capacity threshold comprises a threshold amount of total storage capacity used. In some embodiments, a capacity threshold comprises a threshold percentage of total storage capacity used. In some embodiments, the threshold amount is the full storage capacity of a deduplicating storage system. In some embodiments, capacity forecasting comprises regression analysis. In various embodiments, regression analysis comprises linear regression analysis, logistic regression analysis, ensemble regression analysis, or any other appropriate form and/or type of analysis. In some embodiments, regression analysis comprises fitting a predictive model to an observed data set of input and output values. In some embodiments, an observed data set of values is received from a storage unit. In some embodiments, an observed data set comprises data based at least in part on data received from a deduplicating storage system. In some embodiments, an observed data set comprises a subset of all observed historical data stored in a storage unit. In various embodiments, total storage capacity used is received or total storage capacity used is calculated, or any other appropriate manner of obtaining total storage capacity used. In some embodiments, fitting a predictive model to an observed data set of input and output values comprises determining a function relating a set of input variables and an output variable associated with the observed input and output values. In some embodiments, determining a function comprises determining parameters of the function. In various embodiments, an input variable comprises a date and an output variable comprises total storage capacity used. In some embodiments, a date comprises a number of time steps away from a first date. For example, a date is represented by a number of days, a number of months, a number of years, or any other appropriate number of time steps away from a first date. In various embodiments, an observed data set of input values comprises a data set of observed dates and an observed data set of output values comprises a data set of observed total storage capacity used on each of the observed dates. In some embodiments, a fitted predictive model is used to predict and/or estimate total storage capacity used on a specified date, where the specified date is an input to the fitted predictive model and the total storage capacity used is an output of the fitted predictive model. In some embodiments, an inverse of the fitted predictive model is used to determine a date on which an inputted total storage capacity used will be reached.

In some embodiments, linear regression analysis comprises fitting a linear predictive model to an observed data set of input and output values. For example, a linear predictive model is fitted to an observed data set of selected dates and total storage capacity used on each of the selected dates. The dates and total storage capacity used on each of the selected dates comprise data selected from a storage unit. Observed input values comprise the selected dates. Observed output values comprise the total storage capacity used on each of the selected dates. In some embodiments, a linear function relating dates and total storage capacity used is determined based at least in part on the observed data set of selected dates and total storage capacity used on each of the selected dates. For example, piece-wise linear regression is determined for a set of recent data. In some embodiments, a plurality of linear regressions are fitted to a set of data. The linear regression with the best fit (e.g., having the lowest error or the greatest R squared value) is chosen for forecasting. For example, a linear function such as that shown in equation (1) is determined. In some embodiments, parameters associated with the linear function are determined. In some embodiments, a parameter associated with the linear function comprises a slope of the linear function, an intercept point, or any other appropriate parameter.

$$\text{total storage capacity used} = \alpha + \beta * \text{date} + \epsilon \quad (1)$$

For example, in equation (1), parameter $\alpha$ corresponds to an intercept point, $\beta$ corresponds to a slope, and $\epsilon$ corresponds to an error term.

A forecasted total storage capacity used on a selected input date is predicted based at least in part on the determined linear function (or, for example, fitted predicted model). In some embodiments, a forecasted total storage capacity threshold used date is predicted based at least in part on a linear function, where the linear function determines an output total storage capacity used based at least in part on an input date. In some embodiments, an inverse function of the linear function is used to determine the forecasted total storage capacity used threshold date. For example, a threshold total storage capacity used of a deduplicating storage system is inputted to the inverse linear function, and a storage capacity threshold date is outputted. For example, equation (2) is an inverse function of linear function equation (1).

$$\text{date} = \frac{\text{total storage capacity used} - \alpha - \varepsilon}{\beta} \quad (2)$$

In some embodiments, logistic regression analysis comprises fitting a logistic predictive model to a set of data. In some embodiments, ensemble regression analysis comprises fitting a plurality of predictive models to a plurality of subsets of a set of data. For example, a set of data comprising total storage capacity used on a plurality of days is grouped by day of the week. For example a subset of data corresponding to total storage capacity used on Mondays is determined. A subset of data corresponding to total storage capacity used on Tuesdays is further determined. A first predictive model is fitted to the subset of data corresponding to Mondays. A second predictive model is fitted to the subset of data corresponding to Tuesdays. In some embodiments, data determined using capacity forecasting is stored to a storage unit. In various embodiments, data determined using capacity forecasting comprise a capacity threshold date, a plurality of projected total storage capacity used corresponding to a plurality of dates, or any other appropriate data determined using capacity forecasting. In some embodiments, a fitted predictive model is stored to a storage unit.

In some embodiments, an interface receives capacity forecast generation criteria. In some embodiments, a capacity forecaster comprises default capacity forecast generation criteria. In various embodiments, generation criteria comprise a plurality of threshold values. For example, capacity forecasting is not determined in the event that insufficient historical and/or observed data is available. For example, if less than 10 data points are available, capacity forecasting is not determined. In some embodiments, capacity forecasting is not determined in the event that deduplicating storage system capacity usage is below a specified percentage. For example, if a deduplicating storage system is less than 10 percent full (e.g., a threshold for not forecasting or predicting full date), a capacity forecast is not determined. Or for another example, a capacity forecast is determined in the event that a storage system capacity is above a threshold for determining a forecast (e.g., if the system is 80% full then a capacity forecast is determined and the predicted full date is determined).

In some embodiments, an interface receives capacity forecast model validation criteria from a user. In some embodiments, a capacity forecaster comprises default capacity forecast model validation criteria. In some embodiments, capacity forecast model validation criteria comprise criteria for validating a capacity forecast model. In some embodiments, a capacity forecast model comprises a determined fitted predictive model for regression analysis for capacity forecasting. In various embodiments, validation criteria comprise a plurality of threshold values. Validity of the fitted predictive model is determined based at least in part on whether values associated with the fitted predictive model exceed or do not exceed the plurality of threshold values. In various embodiments, capacity forecast model validation criteria comprise a threshold R squared value, a threshold number of data points in a set of data, a threshold number of standard deviations of data points from a mean and/or expected value of a set of data points, or any other appropriate capacity forecast model validation criteria. For example, in the event that linear regression analysis is determined, capacity forecast model validation criteria comprise criteria determining whether the fitted linear predictive model comprises a positive slope. In some embodiments, an R squared value comprises a measure of goodness of fit of a predictive model to a set of observed data.

In some embodiments, statistical modeling and/or capacity forecasting are determined on a scheduled basis (e.g., daily, weekly, monthly, etc.).

Figure 4:
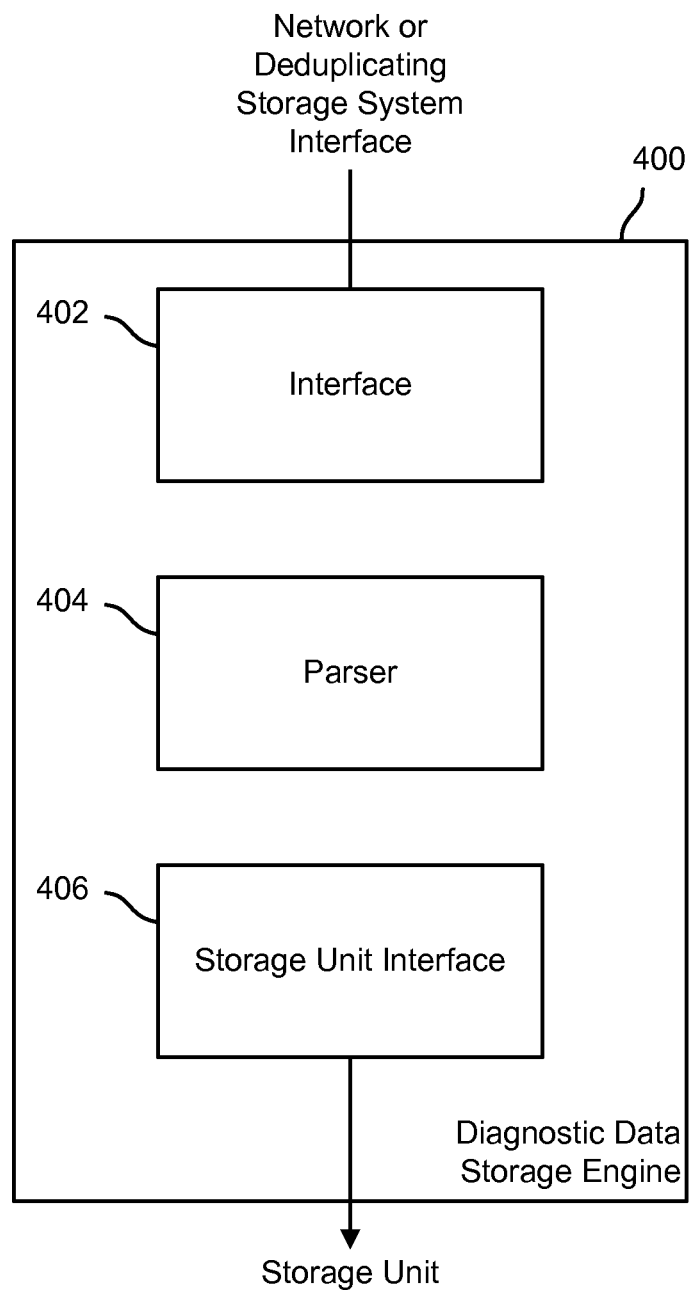
FIG. 4 is a block diagram illustrating an embodiment of a diagnostic data storage engine.

FIG. 4 is a block diagram illustrating an embodiment of a diagnostic data storage engine. In some embodiments, the system of FIG. 4 is used to implement diagnostic data storage engine 208 of FIG. 2A and/or diagnostic data storage engine 211 of FIG. 2B. In the example shown, server diagnostic data storage engine 400 of FIG. 4 comprises interface 402, parser 404, and storage unit interface 406. In some embodiments, interface 402 communicates with a network interface. In some embodiments, interface 402 communicates with a deduplicating storage system interface. In some embodiments, parser 404 parses received diagnostic data information. For example, the parser extracts important/desired data associated with a deduplicating storage system. In some embodiments, extracted diagnostic data is stored to a storage unit using storage system interface 406.

In some embodiments, a diagnostic data storage engine receives a summary of diagnostic data associated with a deduplicating storage system. In some embodiments, the summary is provided by a deduplicating storage system via a phone-home system. In some embodiments, the phone-home system comprises a system for transmitting a summary of diagnostic data from a deduplicating storage system to a deduplicating storage management system. In some embodiments, a diagnostic data storage engine receives an Autosupport. In some embodiments, a summary of diagnostic data associated with a deduplicating storage system comprises a summary based at least in part on a simple network management protocol (SNMP). In some embodiments, a summary based at least in part on SNMP is configured to provide data associated with a deduplicating storage system using a custom application programming interface (API). In some embodiments, a summary of diagnostic data for a deduplicating storage system based at least in part on SNMP comprises CPU information, system load, network bandwidth, or any other appropriate diagnostic data. In some embodiments, the summary comprises an Autosupport. In some embodiments, a parser parses a summary diagnostic data. In some embodiments, parsing a summary of diagnostic data comprises extracting diagnostic data from the summary of diagnostic data.

Figure 5:
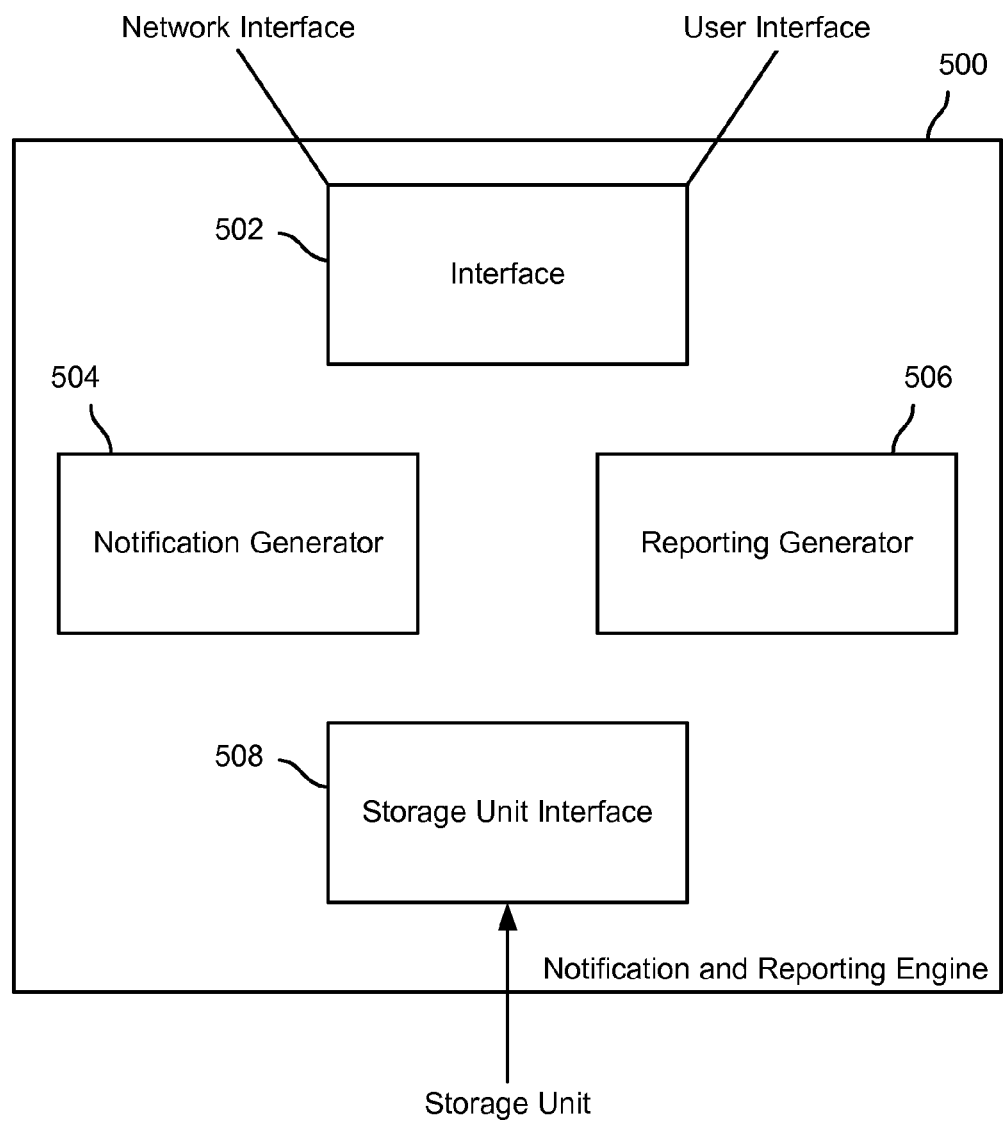
FIG. 5 is a block diagram illustrating an embodiment of a notification and reporting engine.

FIG. 5 is a block diagram illustrating an embodiment of a notification and reporting engine. In some embodiments, the system of FIG. 5 is used to implement notification and reporting engine 210 of FIG. 2A and/or notification and reporting engine 213 of FIG. 2B. In the example shown, notification and reporting engine 500 comprises interface 502, notification generator 504, reporting generator 506, and storage unit interface 508. In some embodiments, interface 502 communicates with a network interface and/or a user interface.

In some embodiments, a notification is generated using a notification generator. In some embodiments, a notification is provided to a client user, server user, web user, or any other appropriate user associated with a deduplicating storage system.

In some embodiments, an interface receives notification inclusion/exclusion critera. In some embodiments, a notification generator comprises default notification inclusion/exclusion criteria. In some embodiments, notification inclusion/exclusion criteria comprise criteria for including/excluding a deduplicating storage system from a notification. In various embodiments, inclusion criteria comprise a plurality of threshold values. In various embodiments, inclusion criteria are based at least in part on diagnostic data, statistical data, performance data, or any other appropriate data. In various embodiments, inclusion criteria comprise a request for inclusion of a deduplicating system by a client user, server user, web user, or any other appropriate user. For example, a user may want to be notified of an existing state or predicted threshold date regardless of whether a threshold is reached within a short time. In some embodiments, inclusion is determined based at least in part on whether values associated with a deduplicating storage system exceed or do not exceed the plurality of threshold values. In some embodiments, inclusion criteria comprise a number of days determined as the number of days between a current date and a forecasted capacity threshold date. For example, if a deduplicating storage system is forecasted to reach a threshold storage capacity within 60 days of the current date, an inclusion criteria has been met. In some embodiments, inclusion criteria comprise a threshold number of standard deviations. In some embodiments, in the event that an observed total capacity storage used data point is greater than a determined average and/or estimated total capacity storage used by the threshold number of standard deviations, an inclusion criteria has been met.

In various embodiments, exclusion criteria comprise a plurality of threshold values. In some embodiments, exclusion criteria comprise a request for exclusion of a deduplicating system by a client user, server user, web user, or any other appropriate user. In some embodiments, exclusion of a deduplicating storage system from a notification is determined based at least in part on whether values associated with a deduplicating storage system exceed or do not exceed the plurality of threshold values. In various embodiments, inclusion criteria are based at least in part on diagnostic data, statistical data, performance data, or any other appropriate data. In various embodiments, exclusion criteria comprise a number of days in which total storage capacity used has not changed, a number of days in which an autosupport has not been received, a percentage decrease in the percentage of total storage capacity used, a number of standard deviations of a total storage capacity used data point away from a determined total storage capacity used average across a specified number of days.

In some embodiments, a deduplicating storage system is included in a notification in the event that at least one inclusion criteria are met and not one of the exclusion criteria is met. In some embodiments, a deduplicating storage system is excluded from a notification in the event that at least one exclusion criteria is met. In some embodiments, a notification comprises a list of one, more than one, or zero deduplicating storage systems. In some embodiments, a notification comprises a list of a plurality of deduplicating storage systems associated with a client user, server user, and/or web user. In some embodiments the list of deduplicating storage systems comprises a ranked list. For example, a list of deduplicating storage systems is ranked by earliest forecasted capacity threshold date.

In some embodiments, notification is provided based at least in part on data stored in a storage unit. In some embodiments, a notification engine provides notification based at least in part on notification inclusion/exclusion criteria. In some embodiments, notification is provided to a client user, server user, web user, or any other appropriate user.

In some embodiments, reporting is generated using a reporting generator. In some embodiments, reporting is provided based at least in part on a request from a client user, server user, and/or web user associated with a deduplicating storage system. In various embodiments, reporting comprises a graph, a report, or any appropriate reporting. In some embodiments, reporting comprises data associated with one or more deduplicating storage systems. In some embodiments, data for reporting is received from a deduplicating storage system, a storage unit of a client deduplicating storage management system, and/or a storage unit of a server deduplicating storage management. In some embodiments, a report comprises a summary of performance metrics.

In some embodiments, an interface receives an indication to provide reporting. In the event that an indication to provide reporting is received, reporting is generated and provided. In some embodiments, a reporting generator provides reporting automatically (e.g., daily, weekly, monthly, etc.). In some embodiments, an interface receives reporting preferences. In some embodiments, reporting preferences are provided by a client user, server user, web user, or any other appropriate user, or a client system, a server system, a web system, or any other appropriate system (e.g., an automated providing of a preference or a providing of a default preference or a providing of a preference generated by a system using an automated engine). In some embodiments, a reporting generator comprises default reporting preferences. In some embodiments, report preferences comprise preferences for generating reporting. In some embodiments, reporting preferences comprise a set of deduplicating storage systems to be included in reporting. In some embodiments, reporting comprises reporting information associated with a set of deduplicating storage systems specified in reporting preferences. In some embodiments, reporting comprises reporting aggregate information. In some embodiments, information is aggregated across a set of storage systems specified by reporting preferences. In various embodiments, aggregate information comprises information aggregrated across a set of deduplicating storage systems associated with an industry. In some embodiments, information for reporting comprises aggregate information across a specified subset of client deduplicating storage systems, where the specified subset of client deduplicating storage system comprises a site, or any other appropriate subset of deduplicating storage systems. In some embodiments, information for report is aggregated across deduplicating storage systems associated with a server and/or client deduplicating storage management system.

In some embodiments, reporting is provided based at least in part on data stored in a storage unit. In some embodiments, reporting is provided based at least in part on reporting preferences. In some embodiments, reporting is provided to a client user, server user, web user, or any other appropriate user.

Figure 6:
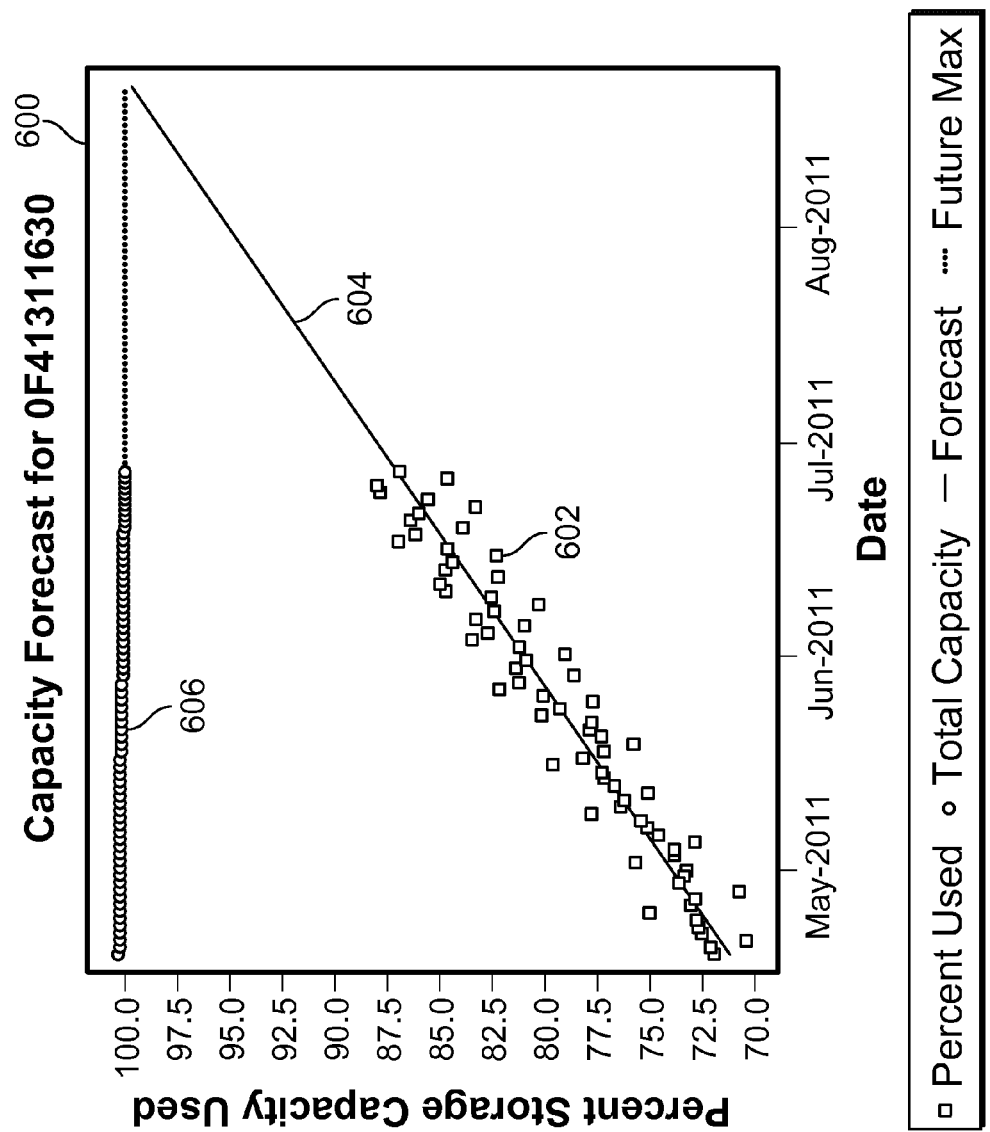
FIG. 6 is a diagram illustrating an embodiment of a reporting graph for displaying a capacity forecast.

FIG. 6 is a diagram illustrating an embodiment of a reporting graph for displaying a capacity forecast. In some embodiments, the graph of FIG. 6 is generated using reporting generator 506 of FIG. 5. In the example shown, graph 600 comprises observed percent storage capacity used 602, capacity forecast 604, and capacity storage used threshold 606. In the example shown, graph 600 displays capacity used with respect to date. In various embodiments, displayed observed capacity used 602 and/or capacity forecast 604 are selected from a storage unit. In various embodiments, a graph comprises a histogram, bar graph, pie graph, line graph, or any other appropriate graph.

Figure 7:
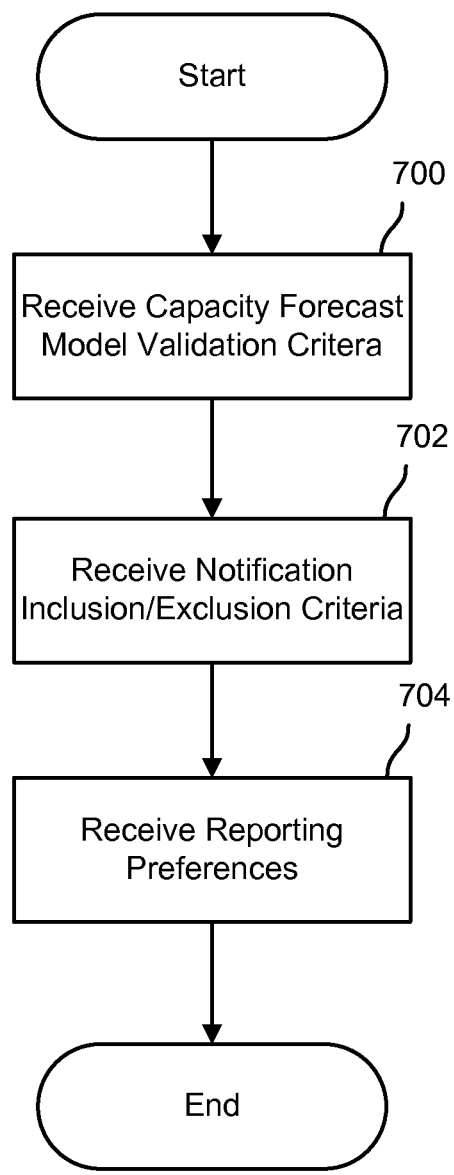
FIG. 7 is a flow diagram illustrating an embodiment of a process for initializing a system for capacity forecasting for a deduplicating storage system.

FIG. 7 is a flow diagram illustrating an embodiment of a process for initializing a system for capacity forecasting for a deduplicating storage system. In some embodiments, the process of FIG. 7 is executed by 200 of FIG. 2A and/or 201 of FIG. 2B. In the example shown, in 700, capacity forecast model validation criteria are received. In 702, notification inclusion/exclusion criteria are received. In 704, reporting preferences are received.

Figure 8:
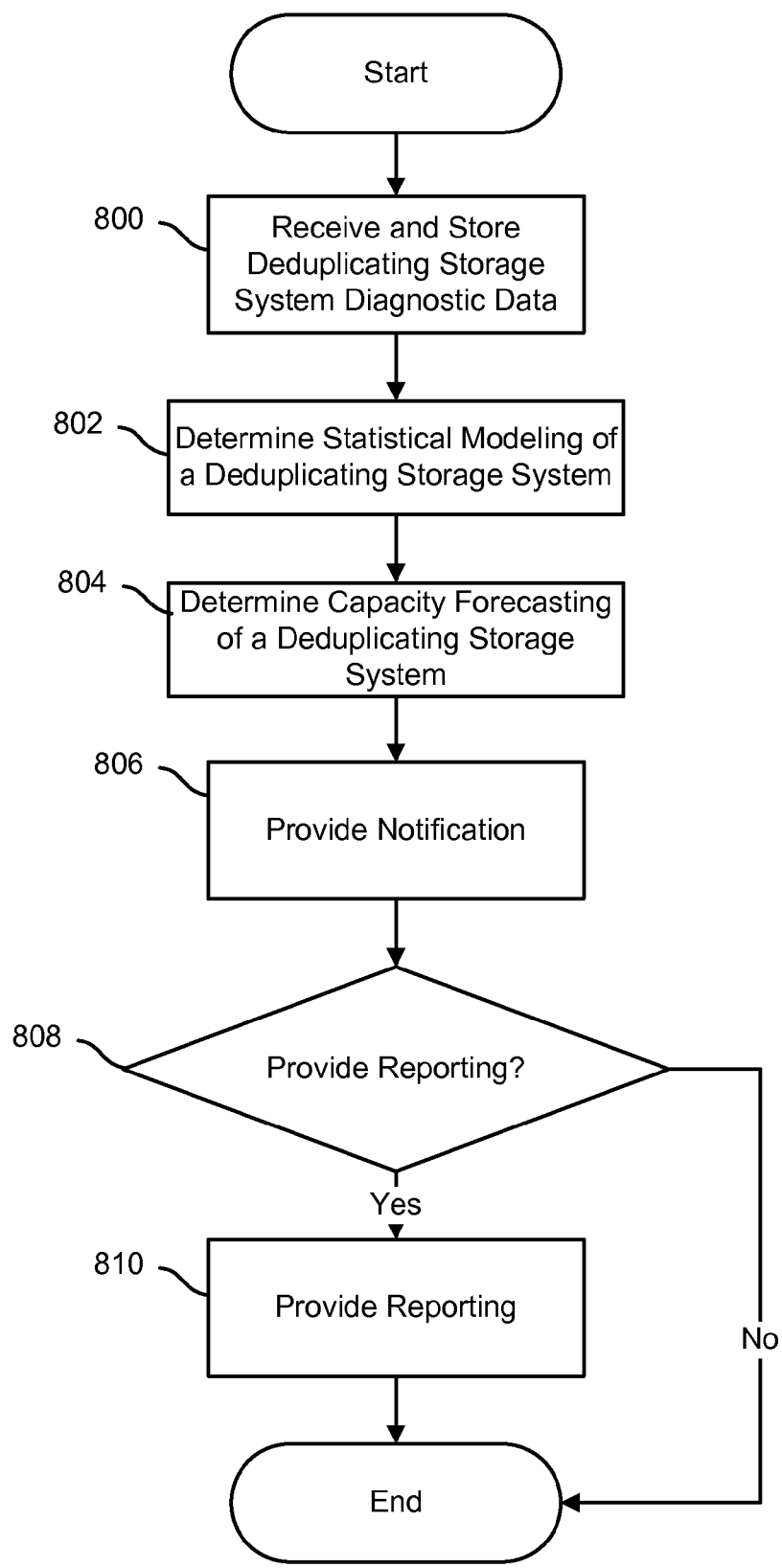
FIG. 8 is a flow diagram illustrating an embodiment of a process for managing a deduplicating storage system.

FIG. 8 is a flow diagram illustrating an embodiment of a process for managing a deduplicating storage system. In some embodiments, the process of FIG. 8 is executed by 200 of FIG. 2A and/or 201 of FIG. 2B. In the example shown, in 800, deduplicating storage system diagnostic data is received and stored. In 802, statistical modeling of a deduplicating storage system is determined. In 804, capacity forecasting of a deduplicating storage system is determined. In 806, notification is provided. In 808, it is determined whether reporting should be provided. In the event that reporting should be provided, in 810, reporting is provided. In the event that reporting should not be provided, the process ends. In various embodiments, providing reporting is based at least in part on a request for reporting from a client user, server user, web user, or any other appropriate user. In some embodiments, reporting is provided automatically (e.g., daily, weekly, monthly, etc.).

Figure 9:
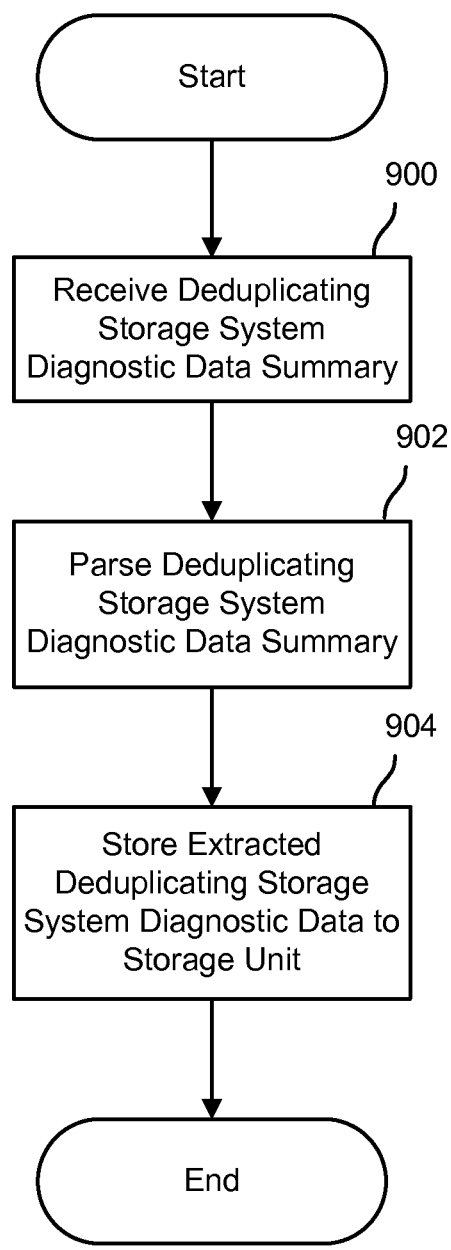
FIG. 9 is a flow diagram illustrating an embodiment of a process for receiving and storing deduplicating storage system diagnostic data.

FIG. 9 is a flow diagram illustrating an embodiment of a process for receiving and storing deduplicating storage system diagnostic data. In some embodiments, the process of FIG. 9 is used to implement process step 800 of FIG. 8. In the example shown, in 900, a deduplicating storage system diagnostic data summary is received. In 902, the deduplicating storage system diagnostic data summary is parsed. For example, the summary is parsed and important/desired data is extracted. In 904, the extracted deduplicating storage system diagnostic data is stored to a storage unit.

Figure 10:
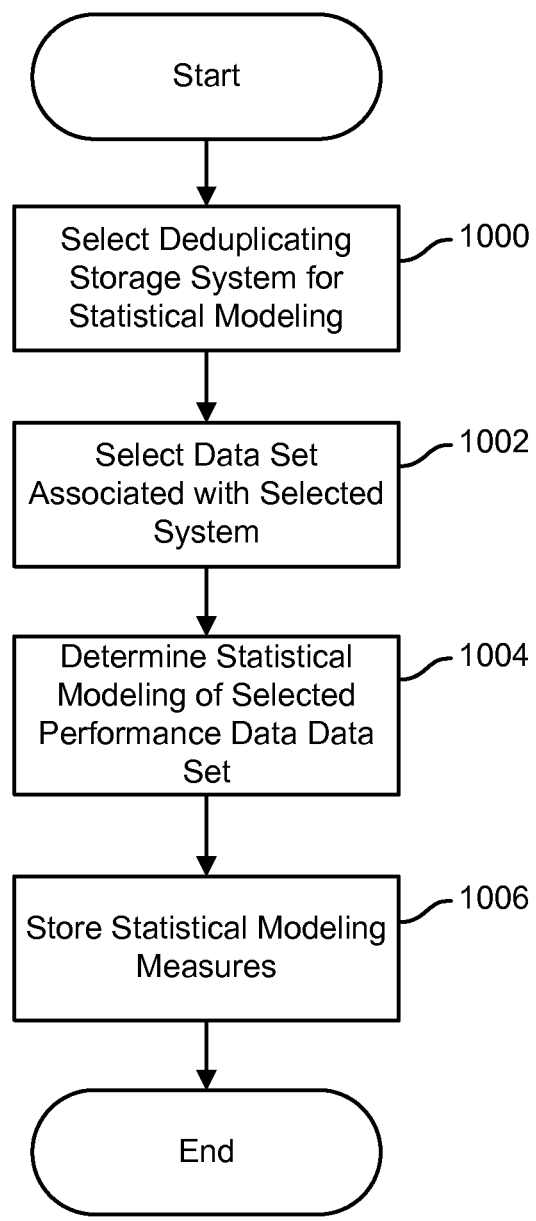
FIG. 10 is a flow diagram illustrating an embodiment of a process for statistical modeling.

FIG. 10 is a flow diagram illustrating an embodiment of a process for statistical modeling. In some embodiments, the process of FIG. 10 is used to implement process step 802 of FIG. 8. In the example shown, in 1000, a deduplicating storage system for statistical modeling is selected. In 1002, a data set associated with the selected deduplicating storage system is selected. In 1004, statistical modeling of the selected data set is determined. In 1006, determined statistical modeling measures are stored in a storage unit. In some embodiments, a deduplicating storage system is selected automatically by a deduplicating storage management system. In some embodiments, a selected data set is a subset of all data associated with a deduplicating storage system. In some embodiments, statistical modeling is determined by a deduplicating storage management system automatically (e.g., daily, weekly, monthly, etc.).

Figure 11:
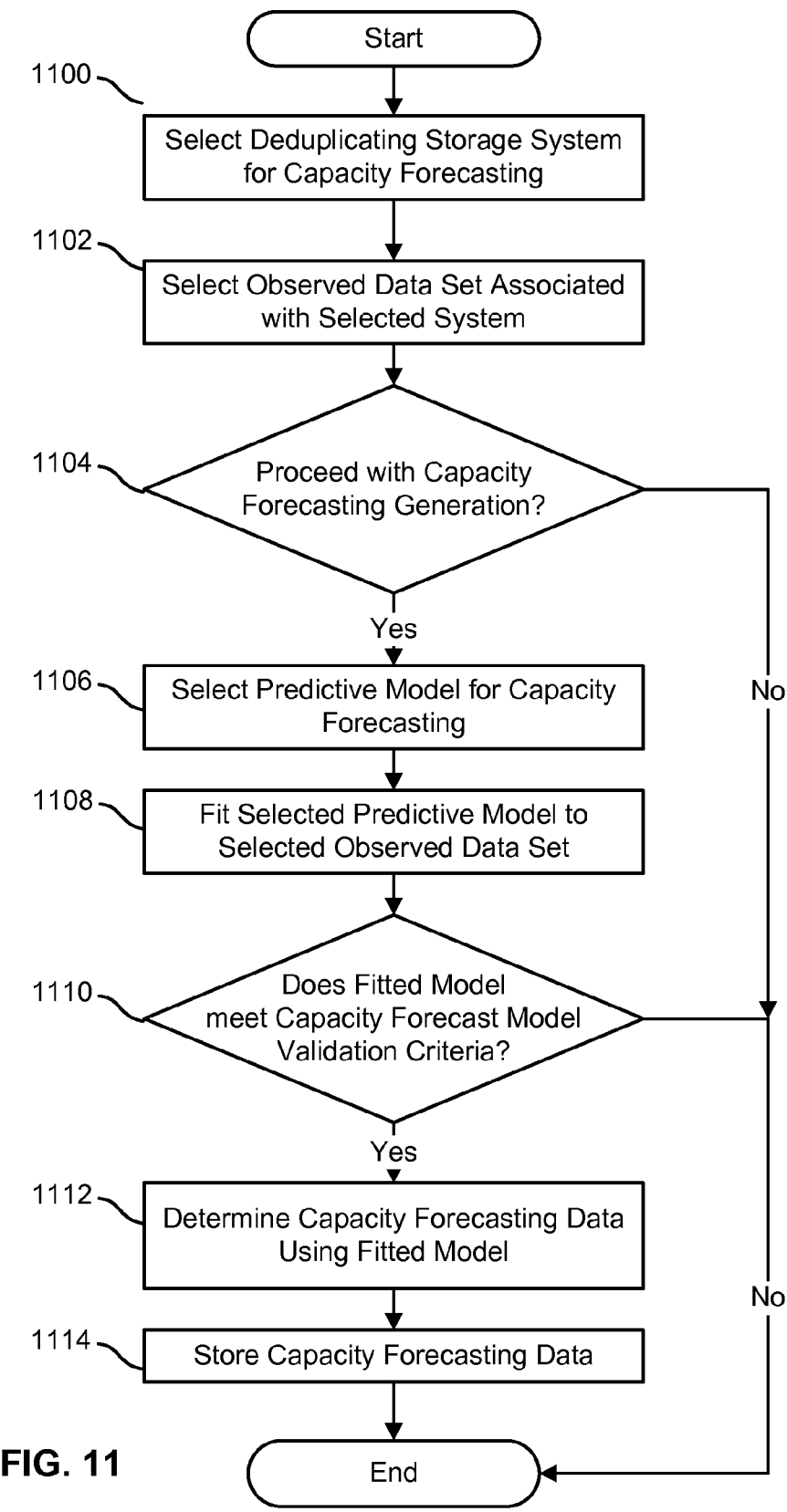
FIG. 11 is a flow diagram illustrating an embodiment of a process for capacity forecasting.

FIG. 11 is a flow diagram illustrating an embodiment of a process for capacity forecasting. In some embodiments, the process of FIG. 11 is used to implement process step 804 of FIG. 8. In the example shown, in 1100, a deduplicating storage system for capacity forecasting is selected. In 1102, a data set comprising observed data associated with the selected deduplicating storage system is selected. In 1104, it is determined whether capacity forecasting is to be generated. For example, capacity forecasting is generated based at least in part on capacity generation criteria. In the event that capacity forecasting is to be generated, the process continues to 1106. In the event that capacity forecasting is not to be generated, the process ends. In 1106, a predictive model for capacity forecasting is selected. In 1108, the selected predictive model is fitted to the selected observed data set. In 1110, it is determined whether the fitted model meets capacity forecast model validation criteria. In the event that the fitted model meets capacity forecast model validation criteria, in 1112, capacity forecasting data is determined based at least in part on the fitted model. In 1114, the capacity forecasting data is stored to a storage unit. In the event that the fitted model does not meet capacity forecast model validation criteria, the process ends. In some embodiments, a selected data set is a subset of all data associated with a deduplicating storage system. In some embodiments, a predictive model comprises a linear model, logistic model, or any other appropriate predictive model. In some embodiments, capacity forecasting is determined by a deduplicating storage management system automatically (e.g., daily, weekly, monthly, etc.).

Figure 12:
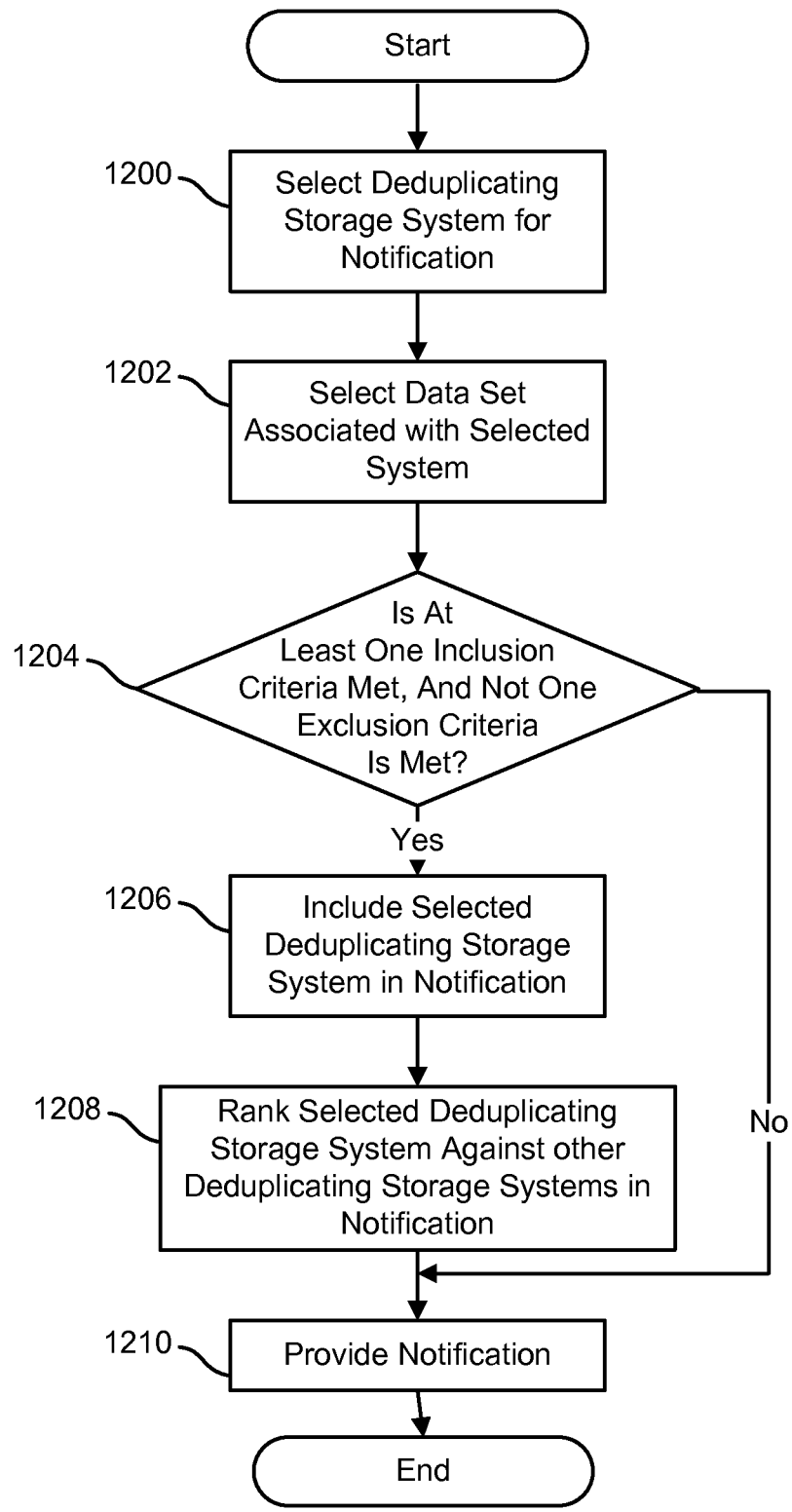
FIG. 12 is a flow diagram illustrating an embodiment of a process for generating and providing notification.

FIG. 12 is a flow diagram illustrating an embodiment of a process for providing notification. In some embodiments, the process of FIG. 12 is used to implement process step 806 of FIG. 8. In the example shown, in 1200, a deduplicating storage system for notification is selected. In 1202, a data set associated with the selected system is selected. In 1204, it is determine whether at least one of notification inclusion criteria and not one of exclusion criteria are met. In the event that at least one of notification inclusion criteria and not one of exclusion criteria are met, in 1206, the selected deduplicating storage system is included in a notification. In 1208, the selected deduplicating storage system is ranked against other deduplicating storage systems in the notification. In 1210, the notification is provided. In the event that not one of the inclusion criteria is met, the process ends. In some embodiments, a selected data set is a subset of all data associated with a deduplicating storage system.

Figure 13:
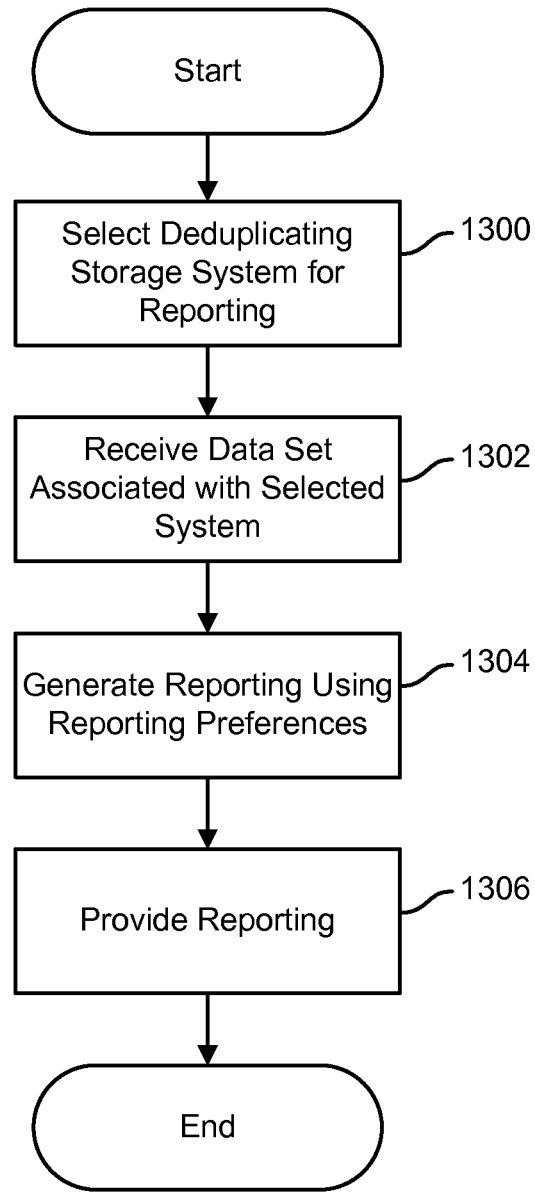
FIG. 13 is a flow diagram illustrating an embodiment of a process for providing reporting.

FIG. 13 is a flow diagram illustrating an embodiment of a process for providing reporting. In some embodiments, the process of FIG. 13 is used to implement process step 810 of FIG. 8. In the example shown, in 1300, a deduplicating storage system for reporting is selected. In 1302, a data set associated with the selected system is received. In 1304, reporting is generated based at least in part on reporting references. In 1306, reporting is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for managing a storage system, comprising:
a memory storing instructions; and
a processor coupled to the memory to execute the instructions from the memory, the processor being configured to:
receive storage system information from a deduplicating storage system that comprises one or more storage units;

in response to the storage system information satisfying generation criteria including the deduplicating storage system capacity being above a threshold, determine a storage capacity forecast using a regression analysis based at least in part on fitting a predictive model to historical data of storage capacity usage included in the storage system information, wherein the regression analysis includes selecting, from a plurality of regressions, a best fitting regression based on an R-squared value to forecast a capacity threshold date for each of the storage units, wherein the capacity threshold date forecasts a date the storage unit reaches a total storage capacity threshold;

wherein the historical data of storage capacity usage includes data corresponding to total storage capacity used on particular days of a week, and the predictive model includes a first predictive model for a first day of the week and a second predictive model, different from the first predictive model, for a second day of the week; and in response to the storage capacity forecast satisfying a preset capacity criteria, manage files stored on at least one of the one or more storage units based at least in part on one or more file management policies and a ranked list the one or more storage units, wherein the ranked list is ranked according to the forecasted capacity threshold date of the storage unit.

2. The system as in claim 1, wherein storage system information comprises one or more of the following: total capacity and total storage capacity used.

3. The system as in claim 1, wherein receiving storage system information comprises receiving a summary of storage system information, and wherein the summary of storage information is parsed, and wherein extracted storage system information from parsing is stored.

4. The system as in claim 1, wherein the processor is further configured to determine a statistical measure, and wherein the statistical measure comprises one or more of: a standard deviation and an average.

5. The system as in claim 1, wherein the regression analysis is based at least in part on the storage system information, wherein the regression analysis is determined for a set of past storage system information data.

6. The system as in claim 5, wherein the regression analysis comprises a linear regression analysis.

7. The system as in claim 5, wherein determining the storage capacity forecast is based at least in part on storage capacity forecast model validation criteria.

8. The system as in claim 7, wherein storage capacity forecast model validation criteria comprise one or more of: a threshold R squared value, a threshold number of standard deviations of data points from an expected value of a set of data points, and a threshold slope.

9. The system as in claim 1, wherein the processor is further configured to provide a notification.

10. The system as in claim 9, wherein the notification comprises a ranked list of included storage systems, wherein the storage systems are included and/or excluded based at least in part on inclusion and exclusion criteria.

11. The system as in claim 10, wherein inclusion criteria comprise a number of days between a first date and a capacity threshold date.

12. The system as in claim 10, wherein exclusion criteria comprise one or more of the following: a number of days in which total storage capacity used has not changed, a number of days in which storage system information has not been received, a percentage decrease in the percentage of total storage capacity used, and a number of standard deviations.

13. The system as in claim 1, wherein a processor is further configured to provide reporting.

14. The system as in claim 13, wherein reporting comprises one or more of: a report and graph.

15. The system as in claim 13, wherein reporting is provided based at least in part on a set of storage systems, wherein storage system information is aggregated information across the set of storage systems.

16. The system of claim 1, wherein the processor is further configured to determine whether the storage capacity forecast satisfies the preset capacity criteria.

17. The system of claim 1, wherein the management of the files stored on at least one of the one or more storage units according to one or more file management policies comprises:

selecting a file to migrate from a first storage unit of the one or more storage units to a second storage unit of the one or more storage units according to a migration policy; and migrating the selected file to the second storage unit.

18. The system of claim 17, wherein the first storage unit and the second storage unit belong to different tiers of a storage hierarchy.

19. The system of claim 1, wherein the managing of the files stored on at least one of the one or more storage units according to one or more file management policies comprises:

selecting a file to delete from one of the one or more storage units according to a purging policy; and purging the selected file to the corresponding storage unit.

20. The system of claim 1, wherein the capacity forecast is determined on a scheduled basis.

21. The system of claim 1, wherein the ranked list ranks at least the one or more storage units according to an earliest forecasted capacity threshold date.

22. The system of claim 1, wherein the management of the files stored on at least one of the one or more storage units includes transferring at least one file from one of the storage units to another storage unit according to at least one of the one or more management policies.

23. The system of claim 22, wherein the management of the files stored on at least one of the one or more storage units further includes transferring metadata associated with the at least one file to the storage unit to which the at least one file is transferred.

24. The system of claim 5, wherein the storage system information includes storage performance data associated with the storage system.

25. The system of claim 5, wherein the regression analysis comprises one a logistic regression analysis or an ensemble regression analysis.

26. A method for managing a storage system, comprising:

receiving storage system information from a deduplicating storage system that comprises one or more storage units;

in response to the storage system information satisfying generation criteria including the deduplicating storage system capacity being above a threshold, determine a storage capacity forecast using a regression analysis based at least in part on fitting a predictive model to historical data of storage capacity usage included in the storage system information, wherein the regression analysis includes selecting, from a plurality of regressions, a best fitting regression based on an R-squared value to forecast a capacity threshold date for each of the storage units, wherein the capacity threshold date forecasts a date the storage unit reaches a total storage capacity threshold;

wherein the historical data of storage capacity usage includes data corresponding to total storage capacity used on particular days of a week, and the predictive model includes a first predictive model for a first day of the week and a second predictive model, different from the first predictive model, for a second day of the week; and in response to the storage capacity forecast satisfying a preset capacity criteria, manage files stored on at least one of the one or more storage units based at least in part on one or more file management policies and a ranked list the one or more storage units, wherein the ranked list is ranked according to the forecasted capacity threshold date of the storage unit.

27. A computer program product for managing a storage system, the computer program product being embodied in a non-transitory computer readable storage medium and comprising computer instructions for:

receiving storage system information from a deduplicating storage system that comprises one or more storage units;

in response to the storage system information satisfying generation criteria including the deduplicating storage system capacity being above a threshold, determine a storage capacity forecast using a regression analysis based at least in part on fitting a predictive model to historical data of storage capacity usage included in the storage system information, wherein the regression analysis includes selecting, from a plurality of regressions, a best fitting regression based on an R-squared value to forecast a capacity threshold date for each of the storage units, wherein the capacity threshold date forecasts a date the storage unit reaches a total storage capacity threshold;

wherein the historical data of storage capacity usage includes data corresponding to total storage capacity used on particular days of a week, and the predictive model includes a first predictive model for a first day of the week and a second predictive model, different from the first predictive model, for a second day of the week; and in response to the storage capacity forecast satisfying a preset capacity criteria, manage files stored on at least one of the one or more storage units based at least in part on one or more file management policies and a ranked list the one or more storage units, wherein the ranked list is ranked according to the forecasted capacity threshold date of the storage unit.

* * * * *